US012291285B1

(12) United States Patent
Ragan

(10) Patent No.: US 12,291,285 B1
(45) Date of Patent: May 6, 2025

(54) FAIRING SAVER

(71) Applicant: Jeremy Ragan, Woodward, OK (US)

(72) Inventor: Jeremy Ragan, Woodward, OK (US)

( * ) Notice: Subject to any disclaimer, the term of this patent is extended or adjusted under 35 U.S.C. 154(b) by 0 days.

(21) Appl. No.: 18/099,355

(22) Filed: Jan. 20, 2023

(51) Int. Cl.
*B25B 1/00* (2006.01)
*B25B 19/00* (2006.01)
*B62D 35/00* (2006.01)
*F16M 13/02* (2006.01)
*B25B 5/00* (2006.01)
*B25B 5/16* (2006.01)
*B25B 7/00* (2006.01)
*B25B 7/04* (2006.01)
*B25B 7/12* (2006.01)
*B25B 7/14* (2006.01)

(52) U.S. Cl.
CPC .............. *B62D 35/001* (2013.01); *B25B 5/00* (2013.01); *B25B 5/16* (2013.01); *B25B 7/00* (2013.01); *B25B 7/04* (2013.01); *B25B 7/123* (2013.01); *B25B 7/14* (2013.01)

(58) Field of Classification Search
CPC ......... B62D 35/001; B25B 7/123; B25B 7/04; B25B 7/14; B25B 7/00; B25B 5/00; F16M 13/02
See application file for complete search history.

(56) References Cited

U.S. PATENT DOCUMENTS

| | | | | |
|---|---|---|---|---|
| 2,913,131 A | | 11/1959 | Holmes | |
| 4,307,635 A | * | 12/1981 | Genova | B25B 7/123 81/463 |
| 4,747,588 A | * | 5/1988 | Dillhoff | B25B 5/14 269/6 |
| 5,143,359 A | * | 9/1992 | Bush | B25B 5/163 81/424 |
| 5,640,876 A | * | 6/1997 | Erwin | B21D 1/12 72/422 |
| 5,829,775 A | | 11/1998 | Maxwell et al. | |
| 6,000,686 A | * | 12/1999 | Yates | B25B 5/142 81/421 |
| 7,086,661 B1 | | 8/2006 | Osborn | |
| 7,819,417 B2 | | 10/2010 | Jones et al. | |
| 8,708,369 B2 | | 4/2014 | Edwards | |
| 9,248,323 B1 | * | 2/2016 | Larsen | A62B 35/0068 |
| 10,822,876 B1 | * | 11/2020 | Parks | E06C 1/32 |
| 10,926,593 B2 | | 2/2021 | Schuettenberg | |
| 11,097,643 B1 | | 8/2021 | Campanella et al. | |
| 2008/0060486 A1 | * | 3/2008 | Robert | B25B 7/123 81/367 |

(Continued)

*Primary Examiner* — Tan Le

(57) ABSTRACT

A fairing saver is a device to protect aerodynamic fairings on a semi-truck from damage while it is being towed backwards. The device utilizes two (2) pairs of clamp style locking pliers. However, in lieu of conventional jaws, each jaw surface on the present Fairing Saver consists of a hard plastic pad, each measuring three inches (3") by six inches (6"). These pads are backed by a steel plate which also provides a pivoting pin that attaches the pad to the pliers. These pliers are then attached to the fairing surfaces of the truck. An attachment clip, welded to each of the pliers, is then used with a ratchet strap or turnbuckle, to keep the sides of the fairing from moving about during the towing process. The locking plier nature of the device means that it can adapt to any thickness of fairing and locks in place with the ultimate in holding power.

1 Claim, 6 Drawing Sheets

(56) References Cited

U.S. PATENT DOCUMENTS

2014/0001327 A1* 1/2014 Penzes ................. B65H 75/446
                                                      248/231.71
2023/0347485 A1* 11/2023 Schmider ................ B25B 7/123

* cited by examiner

FAIRING SAVER

RELATED APPLICATIONS

Non-applicable.

FIELD OF THE INVENTION

The present invention relates to a device which protects the fairings of a tractor trailer when the trailer is being towed backwards.

BACKGROUND OF THE INVENTION

There are countless tractor-trailer trucks that crisscross our country every day. These large vehicles bring just about every object we touch in our daily lives to use. Most of these trucks use aerodynamic fairings to help increase the truck's aerodynamic profile and improve gas mileage. Unfortunately, these trucks, just like any mechanical machine, they will break down at one time or another. This often forces a tow to a repair facility via a large heavy duty tow truck. Standard towing procedures means that the semi-tractor is typically towed backwards.

Sadly, this practice means the fairings, now moving backwards through the wind, are exposed to likely damage. This can cost the truck owner and/or the towing company thousands of dollars to repair. Accordingly, there exists a need for a means by which aerodynamic fairings on trucks, being towed backwards, can be protected from damage. The development of the Fairing Saver fulfills this need.

SUMMARY OF THE INVENTION

To achieve the above and other objectives, the present invention provides for a fairing saver which is a device that has of a fairing grip, which contains a locking C-clamp, an anchor ring, and a pair of fairing blocks and restraint that is removably couples to the anchor ring. The fairing grip can be attached to an individual fairing by clamping the pair of fairing blocks against opposing sides of the individual fairing. The locking C-clamp has a fixed jaw, moveable jaw, fixed handle, moveable handle and a spring. The fixed jaw and the moveable jaw may both be C-shaped and oriented in opposite directions. The moveable jaw pivotally attaches to the fixed jaw to change the locking C-clamp between a closed and open position. The fixed handle and moveable handle may be used to open and close the clamp, and an adjustment screw and knob is also present for adjusting the distance between the jaws.

The fairing saver may have a moveable handle and jaw which are pivotably coupled together at a second pivot, a fixed jaw, an adjustment screw, a release lever, a spring, fairing blocks, and a restraint. The moveable handle may include a link bar which is pivotably coupled to it at a third pivot, and the proximal end of this bar presses against the front surface of the adjustment screw. The release lever, which may also pivotably coupled to the moveable handle at a fourth pivot, can be moved in order to apply force to the handle to open the locking C-clamp. The spring may be coupled between the moveable jaw and the fixed handle and applies tension to the moveable jaw when the locking C-clamp is in the open position. The fairing blocks may be coupled to each end of the moveable and fixed jaws and press against opposing sides of an individual fairing when the locking C-clamp is in the closed position. The fairing blocks may consist of a contact pad and a back plate. The restraint used may be a strap with at least one length adjuster or a rope tied at a predetermined length and the anchor ring is an annular armature coupled to the moveable jaw which can be used to attach the restraint to the locking C-clamp.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
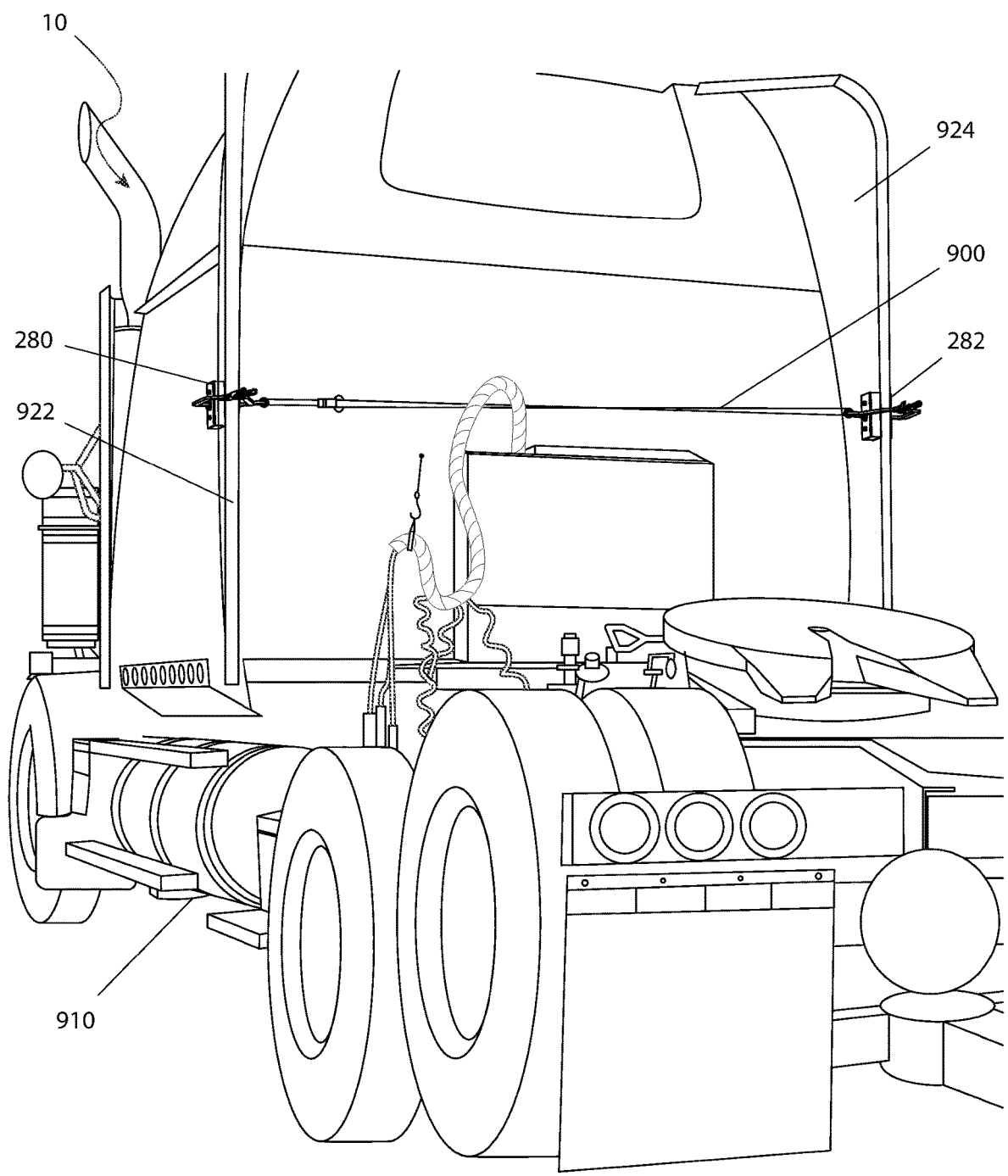
FIG. 1 is an in-use view of a fairing saver, according to an embodiment of the present invention, illustrating the use of a first fairing grip, a second fairing grip, and a restraint on cab side fairings.
Figure 2:
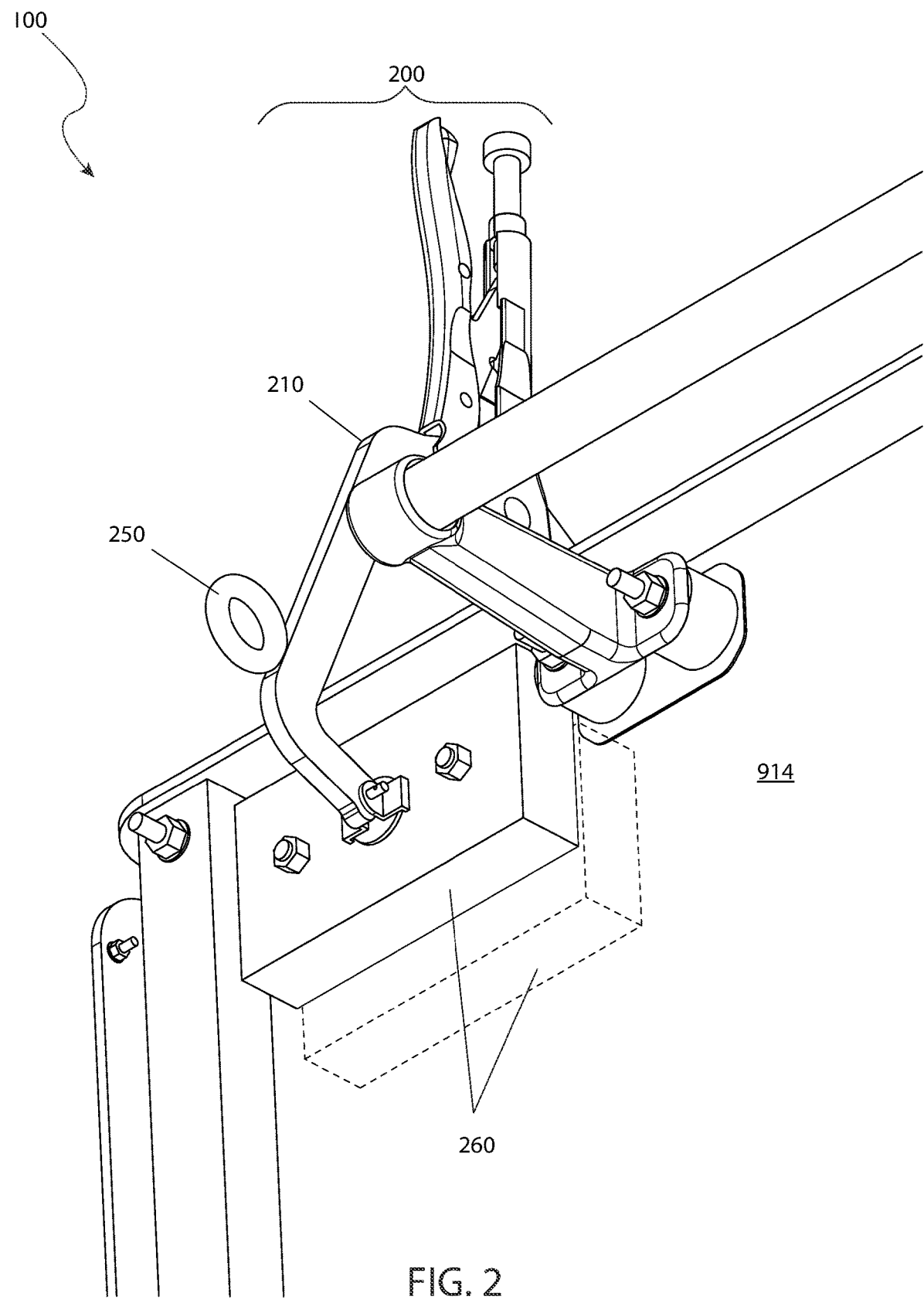
FIG. 2 is a detail in-use view of a fairing saver, according to an embodiment of the present invention.
Figure 3:
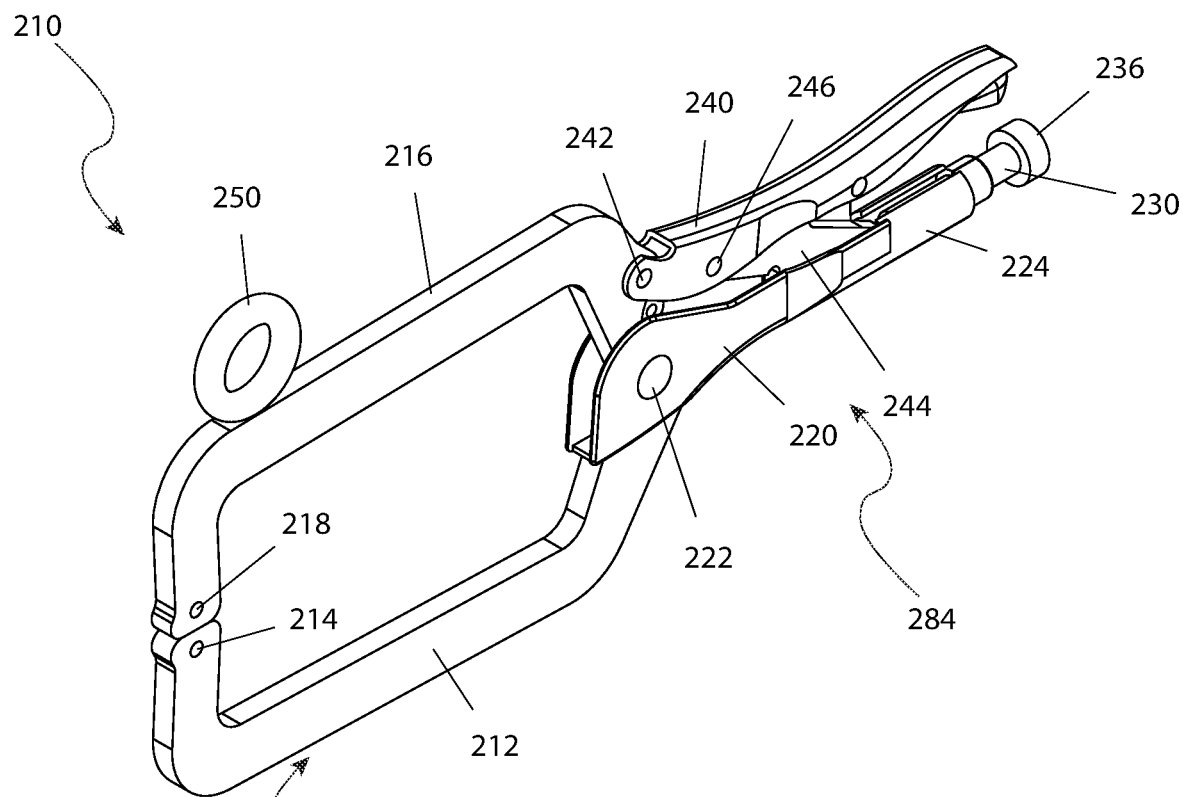
FIG. 3 is an isometric front view of a locking C-clamp and an anchor ring, according to an embodiment of the present invention.
Figure 4:
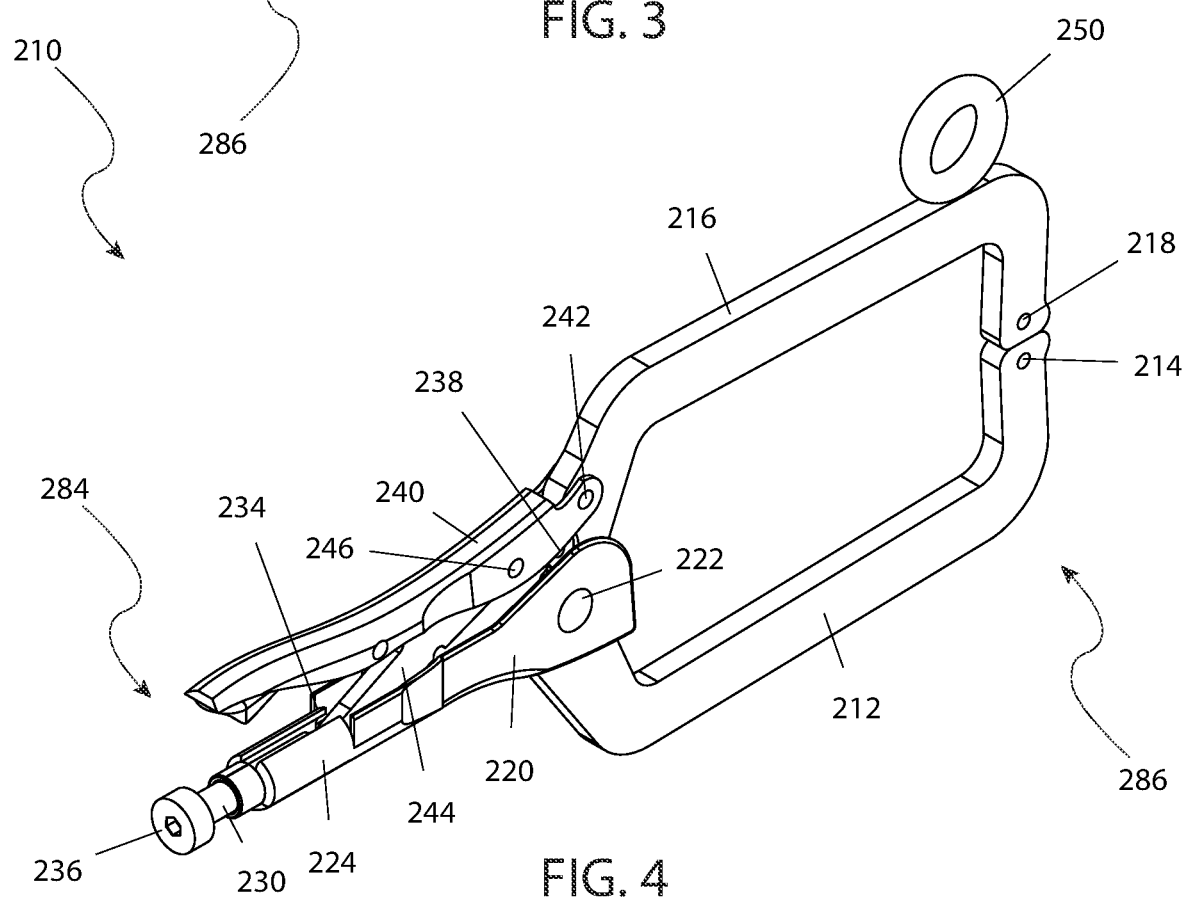
FIG. 4 is an isometric rear view of a locking C-clamp and an anchor ring, according to an embodiment of the present invention.
Figure 5:
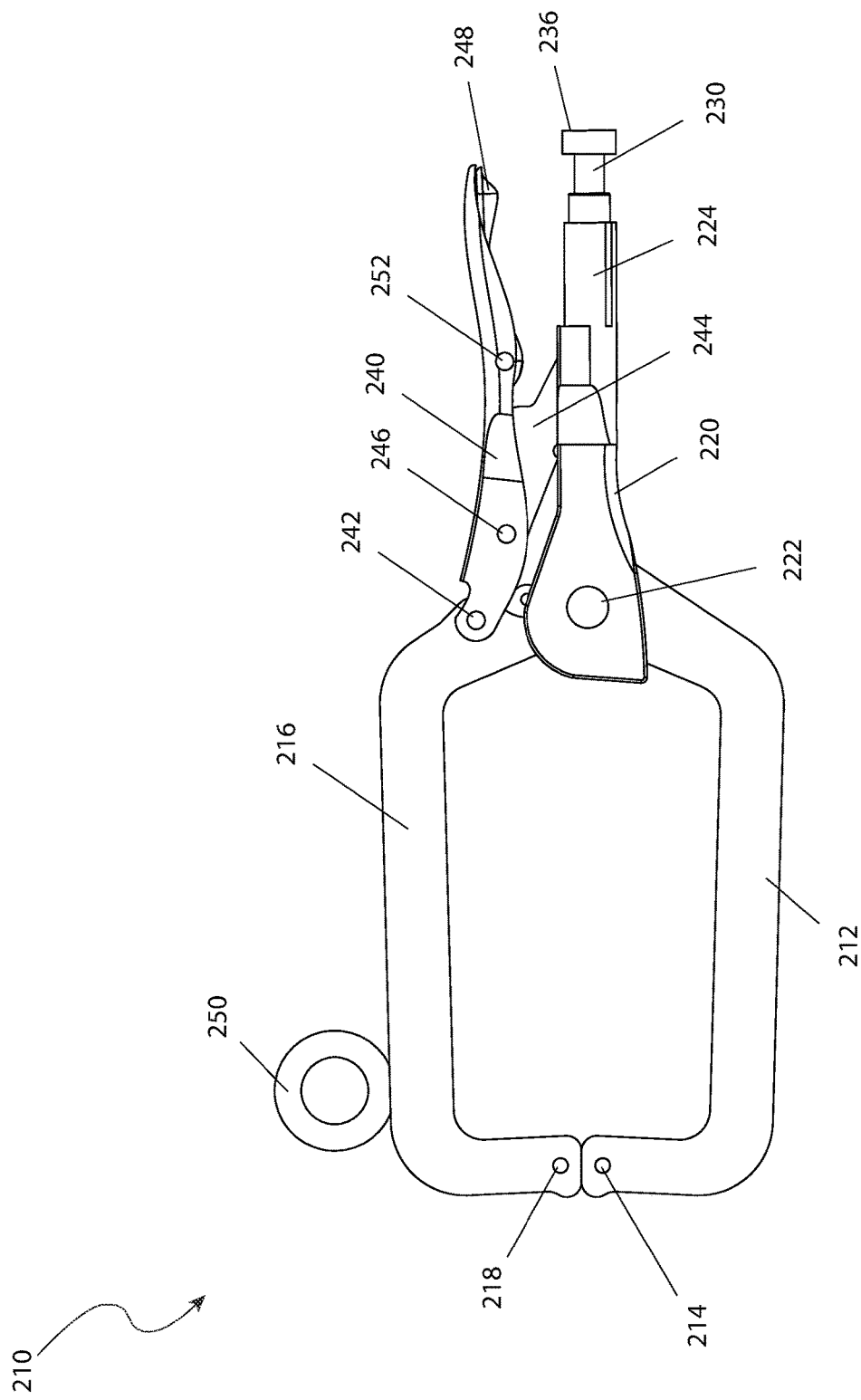
FIG. 5 is a left side view of a locking C-clamp and anchor ring, according to an embodiment of the present invention.
Figure 6:
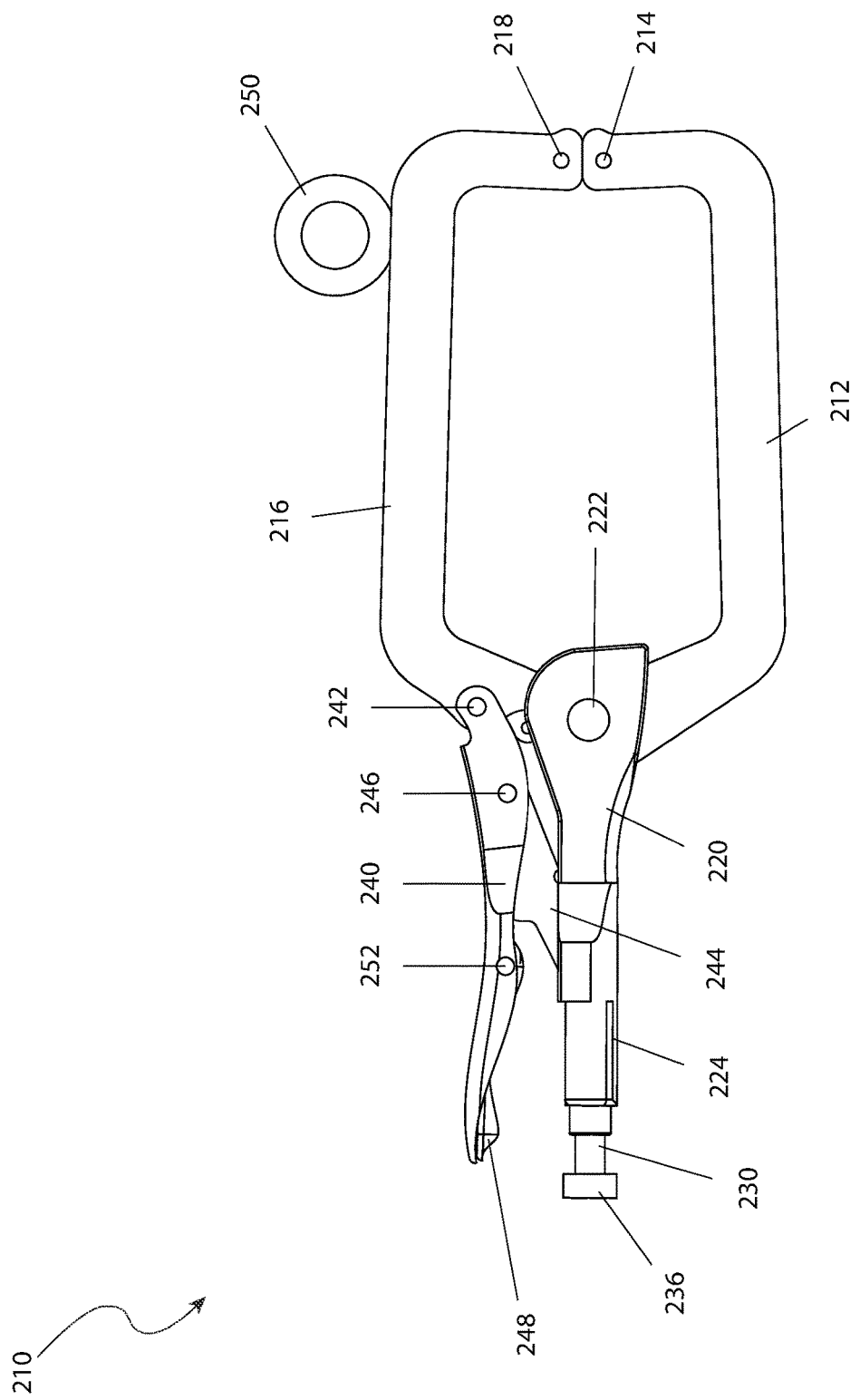
FIG. 6 is a right side view of a locking C-clamp and anchor ring, according to an embodiment of the present invention.
Figure 7:
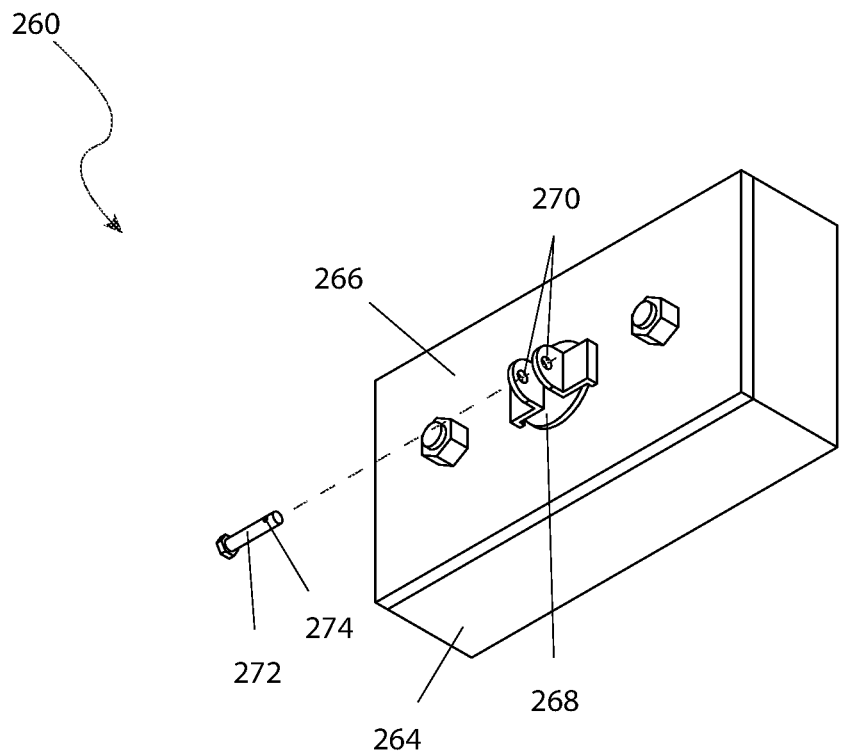
FIGS. 7-8 are isometric views of a pair of fairing blocks, according to an embodiment of the present invention.
Figure 8:
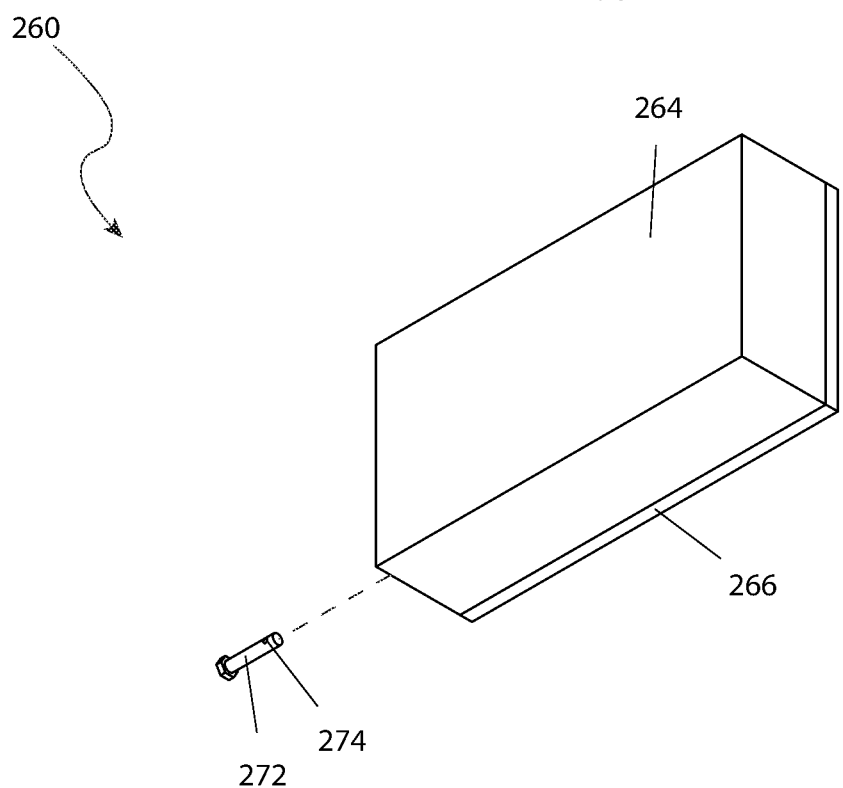

DESCRIPTIVE KEY 100 fairing saver
200 fairing grip
210 locking C-clamp
212 fixed jaw
214 fixed jaw block aperture
216 moveable jaw
218 moveable jaw block aperture
220 fixed handle
222 first pivot
224 threaded cylinder
230 adjustment screw
234 front surface
236 adjustment knob
238 spring
240 moveable handle
242 second pivot
244 link bar
246 third pivot
248 release lever
250 anchor ring
252 fourth pivot
260 pair of fairing blocks
264 contact pad
266 back plate
268 mounting bracket
270 mounting aperture
272 mounting pin
274 mounting pin aperture
280 first fairing grip
282 second fairing grip
284 proximal end
286 distal end
900 restraint 910 tractor unit
914 individual fairing
922 left cab side fairing
924 right cab side fairing

DESCRIPTION OF THE INVENTION

The present invention is directed to a fairing saver (herein described as the "invention") 100. The invention 100 may comprise a fairing grip 200 that may be removably coupled to one (1) or more fairings of a tractor unit 910 of a tractor-trailer. As non-limiting examples, the fairing grip 200 may be coupled individually or in pairs to support the fairings during towing. A first fairing grip 280 may be coupled to an individual fairing 914 and a restraint 900 may be coupled between the first fairing grip 280 and an anchor point to prevent the individual fairing 914 from deforming due to air pushing against the inside of the individual fairing 914. The anchor point may be a second fairing grip 282. As non-limiting examples, the fairings may be a cab roof fairing or cab side fairings.

The fairings of the tractor unit 910 are generally designed to improve fuel efficiency of the tractor-trailer as the tractor-trailer moves forward by directing air past the fairings and around the trailer. However, when the tractor unit 910 is towed by lifting at the rear and pulling the tractor unit 910 backwards, the fairings may divert air to a path that sends the air behind the fairings. The diverted air may be turbulent and may exert forces upon the fairings that exceed the design specifications of the fairings. In worst case scenarios, the air may cause the fairings to deform or break. The invention 100 may prevent damage to the fairings when the tractor unit 910 is being towed backwards by preventing movement of the fairings due to turbulent air circulating behind the fairings.

The fairing grip 200 may comprise a locking C-clamp 210, an anchor ring 250, and a pair of fairing blocks 260. The fairing grip 200 may removably couple to the individual fairing 914 by clamping the pair of fairing blocks 260 against opposing sides of the individual fairing 914. The restraint 900 may removably couple to the anchor ring 250. As non-limiting examples, the restraint 900 may be a strap with at least one (1) length adjuster or a rope tied to be a specific length.

The locking C-clamp 210 may comprise a fixed jaw 212, a moveable jaw 216, a fixed handle 220, a moveable handle 240, and a spring 238. The locking C-clamp 210 may be reconfigured between the clamp closed position and the clamp open position. The locking C-clamp 210 may lock into the clamp closed position due to over-center cam action of the locking C-clamp 210. In the clamp closed position, distal ends 286 of the fixed jaw 212 and the moveable jaw 216 may press together. In the clamp open position, the distal ends 286 of the fixed jaw 212 and the moveable jaw 216 may separate.

The fixed jaw 212 and the moveable jaw 216 may be C-shaped armatures that are oriented in opposing directions such that a gap exists between the center of the fixed jaw 212 and the center of the moveable jaw 216 when the ends of the fixed jaw 212 and the moveable jaw 216 are in contact. The distal end 286 of the fixed jaw 212 may comprise a fixed jaw block aperture 214 and the distal end 286 of the moveable jaw 216 may comprise a moveable jaw block aperture 218. The pair of fairing blocks 260 may removably couple to the locking C-clamp 210 via the fixed jaw block aperture 214 and the moveable jaw block aperture 218.

The moveable jaw 216 may pivotably couple to the fixed jaw 212 at a first pivot 222. The moveable jaw 216 may pivot at the first pivot 222 in order to reconfigure the locking C-clamp 210 between the clamp closed position and the clamp open position.

The fixed handle 220 may be adapted to be grasped by a user. The fixed handle 220 may be coupled to the fixed jaw 212. The fixed handle 220 may comprise a threaded cylinder 224 that is longitudinally oriented. An adjustment screw 230 may be threadedly coupled to the fixed handle 220 via the threaded cylinder 224.

The adjustment screw 230 may be operable to tighten and loosen the clamp closed position of the locking C-clamp 210 by adjusting the separation distance between the distal end 286 of the fixed jaw 212 and the distal end 286 of the moveable jaw 216. The adjustment screw 230 may be moved in a distal direction by rotating the adjustment screw 230 in a first rotational direction to tighten the locking C-clamp 210. The adjustment screw 230 may be moved in a proximal direction by rotating the adjustment screw 230 in a second rotational direction to loosen the locking C-clamp 210. The adjustment screw 230 may comprise an adjustment knob 236 that may be adapted for the user to grasp while rotating the adjustment screw 230.

The moveable handle 240 may be operable to close the locking C-clamp 210 as the moveable handle 240 is pushed towards the fixed handle 220. The moveable handle 240 may be operable to open the locking C-clamp 210 as the moveable handle 240 is pulled away from the fixed handle 220. The moveable handle 240 may be pivotably coupled to the moveable jaw 216 at a second pivot 242.

The moveable handle 240 may comprise a link bar 244. The distal end 286 of the link bar 244 may be pivotably coupled to the moveable handle 240 at a third pivot 246. A proximal end 284 of the link bar 244 may press against a front surface 234 of the adjustment screw 230. The link bar 244 may create the over-center cam action that may lock the locking C-clamp 210 in the clamp closed position. Specifically, the over-center cam action may occur where the third pivot 246 crosses an imaginary center line drawn from the second pivot 242 to the point where the link bar 244 presses against the front surface 234 of the adjustment screw 230. When the third pivot 246 is on one side of the imaginary center line, the locking C-clamp 210 will tend to remain in the clamp open position. When the third pivot 246 is on the opposite side of the imaginary center line, the locking C-clamp 210 will tend to remain in the clamp closed position. An external force may be required to move the second pivot 242 across the imaginary center line in either direction.

The moveable handle 240 may comprise a release lever 248. The release lever 248 may be pivotably coupled to the moveable handle 240 at a fourth pivot 252. The release lever 248 may be adapted to be moved by the user in order to apply force to the moveable handle 240 to open the locking C-clamp 210.

The spring 238 may be coupled between the moveable jaw 216 and the fixed handle 220. The spring 238 may apply tension to the moveable jaw 216. The spring 238 may be operable to separate the moveable jaw 216 and the fixed jaw 212 when the locking C-clamp 210 is in the clamp open position.

The anchor ring 250 may be an annular armature coupled to the moveable jaw 216. The anchor ring 250 may be operable as an attachment point for coupling the restraint 900 to the locking C-clamp 210.

The pair of fairing blocks 260 may couple to the distal ends 286 of the moveable jaw 216 and the fixed jaw 212. The pair of fairing blocks 260 may press against opposing sides of the individual fairing 914 when the locking C-clamp 210 is in the clamp closed position.

An individual fairing block selected from the pair of fairing blocks 260 may comprise a contact pad 264 and a back plate 266. The contact pad 264 may have the shape of a right rectangular prism. The contact pad 264 may be made from a non-rigid material such that the contact pad 264 avoids marring the finish of the individual fairing 914. The contact pad 264 may be coupled to the back plate 266. As non-limiting examples, the contact pad 264 may be coupled to the back plate 266 by an adhesive or by mounting hardware.

The back plate 266 may be a rigid rectangular plate. The back plate 266 may comprise a mounting bracket 268 for coupling the individual fairing block to the locking C-clamp 210. The mounting bracket 268 may comprise one (1) or more mounting apertures 270 that accept a mounting pin 272. The individual fairing block may be coupled to the fixed jaw 212 by sliding the mounting pin 272 through the mounting apertures 270 and through the fixed jaw block aperture 214. The individual fairing block may be coupled to the moveable jaw 216 by sliding the mounting pin 272 through the mounting apertures 270 and through the moveable jaw block aperture 218.

The mounting pin 272 may comprise a mounting pin aperture 274. The mounting pin 272 may be held in place by the head of the mounting pin 272 that prevents movement of the mounting pin 272 in one (1) direction and by a retaining pin that removably couples to the mounting pin 272 via the mounting pin aperture 274 and prevents movement of the mounting pin 272 in the opposite direction. As non-limiting examples, the retaining pin may be an R clip or a split pin.

In use, a fairing grip 200 may be clamped onto an individual fairing 914 by placing the pair of fairing blocks 260 on either side of the individual fairing 914 while the locking C-clamp 210 is in the clamp open position and by squeezing the fixed handle 220 and the moveable handle 240 to close the locking C-clamp 210. The adjustment screw 230 may be turned, if necessary, to assure that the locking C-clamp 210 locks while in the clamp closed position. The restraint 900 may be coupled to the anchor ring 250 of the fairing grip 200 and to an anchor point. As a non-limiting example, the individual fairing 914 may be the cab roof fairing and the anchor point may be a portion of the frame of the tractor unit 910.

The fairing grips 200 may be used in pairs. As a non-limiting example, the fairing grips 200 may be coupled to the cab side fairings (also known as cab extenders). The first fairing grip 280 may be coupled to a left cab side fairing 922 and the second fairing grip 282 may be coupled to a right cab side fairing 924. The restraint 900 may be coupled between the first fairing grip 280 and the second fairing grip 282 and the restraint 900 may be tightened to prevent the cab side fairings from splaying during towing.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A fairing saver, comprising:
a fairing grip including a locking C-clamp with a fixed jaw and a movable jaw;
an anchor ring attached to the movable jaw;
a pair of fairing blocks each having a contact pad made of a non-rigid material and a back plate, the fairing blocks configured to be coupled to the fixed and movable jaws;
a restraint removably coupling to the anchor ring;
a movable handle pivotably coupled to the locking C-clamp, the movable handle including a link bar pivotably coupled to the movable handle at a first pivot and to the movable jaw at a second pivot, the link bar pressing against an adjustment screw to create an over-center cam action, thereby locking the locking C-clamp in a closed position when the link bar crosses an imaginary centerline between the first pivot and the adjustment screw;
a spring configured to apply tension to the movable jaw to separate the fixed and movable jaws when in an open position; and,
a mounting bracket for the pair of fairing blocks, the mounting bracket including one or more apertures; and,
wherein the locking C-clamp is reconfigured between a clamp closed position and a clamp open position through over-center cam action; and,
wherein the fairing blocks are coupled to the fixed and movable jaws using a mounting pin that passes through the apertures and the jaws, secured by a retaining pin.

* * * * *